US006911757B2

(12) United States Patent
Lopatinsky et al.

(10) Patent No.: US 6,911,757 B2
(45) Date of Patent: Jun. 28, 2005

(54) RING STATOR MOTOR DEVICE

(75) Inventors: Edward L. Lopatinsky, San Diego, CA (US); Dan K. Shaefer, Palm Desert, CA (US); Saveliy T. Rosenfeld, San Diego, CA (US); Lev A. Fedoseyev, El Cajon, CA (US); Roudolf Evseev, St. Petersburg (RU); Popov Victor, St. Petersburg (RU)

(73) Assignee: Rotys Inc., San Diego, CA (US)

( * ) Notice: Subject to any disclaimer, the term of this patent is extended or adjusted under 35 U.S.C. 154(b) by 0 days.

(21) Appl. No.: 10/215,939

(22) Filed: Aug. 9, 2002

(65) Prior Publication Data

US 2003/0030348 A1 Feb. 13, 2003

Related U.S. Application Data

(60) Provisional application No. 60/311,297, filed on Aug. 10, 2001.

(51) Int. Cl.[7] ............................................. H02K 19/00

(52) U.S. Cl. .................. 310/164; 319/216; 319/DIG. 6

(58) Field of Search ................................ 310/164, 216, 310/DIG. 6

(56) References Cited

U.S. PATENT DOCUMENTS 4,645,961 A * 2/1987 Malsky ........................ 310/156
4,894,572 A * 1/1990 Shiraki ........................ 310/179

\* cited by examiner

Primary Examiner—Nicholas Ponomarenko
Assistant Examiner—Iraj Mohandesi

(57) ABSTRACT

An integrated drive motor assembly is described where the functional components of a powered device are an integral part of the motor. The assembly comprises a brushless, direct current drive motor having a ring-shaped stator with flat printed circuit coil windings, a ring-shaped permanent magnet rotor, and an electronic commutator circuit. Functional embodiments of the assembly include a rotor impeller and an axial flow fan.

5 Claims, 10 Drawing Sheets

RING STATOR MOTOR DEVICE

CROSS REFERENCE TO RELATED APPLICATIONS

The present application claims the benefit of priority of U.S. Provisional Patent Application Ser. No. 60/311,297, filed Aug. 10, 2001 for Edward Lopatinsky, et al. the entire content of which is incorporated herein by reference.

FIELD OF THE INVENTION

The present invention relates to a brushless DC motor device and more particularly to a permanent magnet brushless motor assembly.

BACKGROUND OF THE INVENTION

Brushless DC motors in various forms are well known in the art as described, for example, in U.S. Pat. Nos. 4,228,384 and 6,307,337. Such motors use an electronic controller instead of an armature commutator and brush assembly to switch the flow of current to individual motor winding coils.

A major limiting factor in the performance of conventional DC motors is internal heating, where the heat generated in the iron-cored coils of the motor armature escapes via an inefficient thermal path through the shaft and bearings of the motor assembly or through the airgap between the armature and field magnets to an outer casing.

In a brushless DC motor, the motor armature is a permanent magnet rotor assembly and the stator comprises a group of wound iron core coils. For better cooling, the stator coils are positioned in a casing to provide a short, efficient, thermal path to the outside air. Cooling can further be improved by blowing air over the casing and adding heat-removing fins. This ease of cooling allows a brushless motor to produce a much higher power in relation to its size than a motor with a conventional brush and commutator assembly.

A major advantage of brushless motors is their lack of conventional commutator and brush hardware. These items are a source of wear and may require frequent maintenance.

Brushless motors have certain disadvantages. For example, in order to drive a brushless motor, control electronics are necessary to selectively switch current through appropriate motor winding coils. The circuitry is often complex in order to provide the necessary timing sequence. In addition, the use of wound iron-core coils increases the weight and size of the motor assembly. Further, eddy current losses produced in iron-core coils reduce motor efficiency. These factors increase the manufacturing cost of devices using brushless motor technology.

Typically, a drive motor is connected to another assembly to perform a useful function. A motor, for example, may be connected to a fan, pump, or other type of device to provide operating power for the device.

Integrated assemblies can be made, however, using brushless drive motor technology, where the functional components of a powered device are an integral part of the motor assembly.

Accordingly, a need exists for an improved integrated brushless direct current motor device that does not use iron core coils, is easily cooled, and is compact and economical to manufacture.

BRIEF SUMMARY OF THE INVENTION

An integrated direct current, brushless motor assembly is described where the functional components of a powered device are an integral part of the motor. The device comprises a novel ring-shaped stator assembly with flat, printed circuit type coil windings, a permanent magnet ring-shaped rotor assembly disposed within the stator assembly and an electronic stator coil commutator circuit.

DETAILED DESCRIPTION OF THE INVENTION

Figure 1:
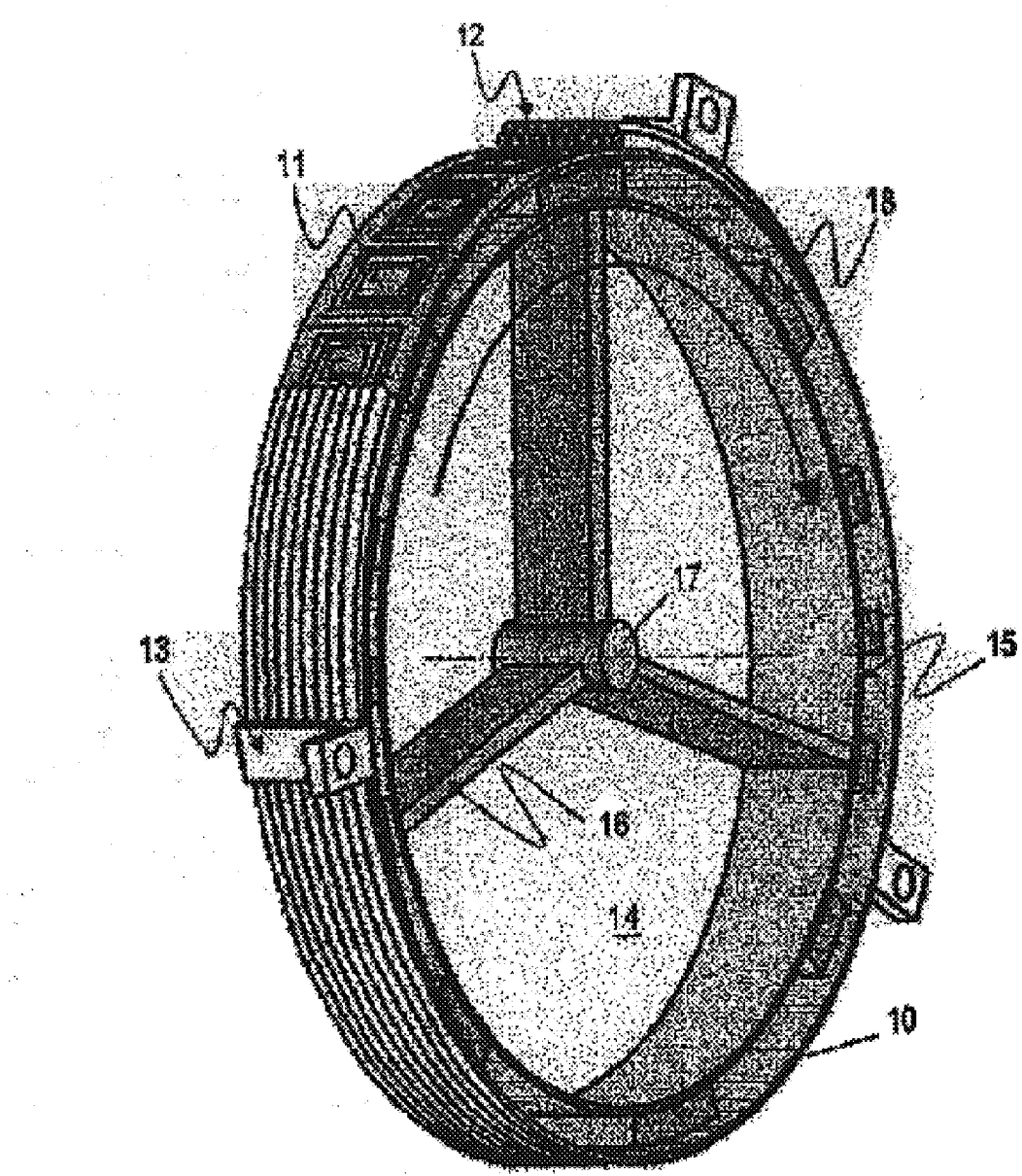
FIG. 1 is a structural view of a ring type motor of the invention.

With reference to FIG. 1, one embodiment of the rotor and stator assembly of a motor of the invention comprises a ring-shaped stator 10 with a plurality of flat printed circuit coil windings 11 circumferentially positioned around the stator periphery, and a rotatable rotor assembly 14 having a ring-shaped rotor band 15 with a plurality of permanent magnets 18 circumferentially positioned around the rotor band periphery. The diameter of the stator ring is chosen to be slightly larger than the diameter of the rotor band.

A magnetic bridge 12, comprising a continuous spiral wrapping of soft iron wire or laminated bands of soft iron, surrounds the stator to connect and concentrate magnetic flux between the coil windings and the rotor magnets. The magnetic bridge is fixed in close proximity to the stator but may also be manufactured as a movable part that is mechanically connected to the rotor assembly.

As shown in FIG. 1, the stator 10 and magnetic bridge 12 can be secured to a mounting surface by one or more suitable fasteners 13.

The printed circuit stator coils are flat, spirally wound coils of copper or other electrically conducting material placed in close proximity to each other along a ring-shaped substrate of electrically insulating material. The coils can be coated with a nickel-gold plating, for example, to increase the magnetic attraction between the coils and the rotor magnets and to align the coils and magnets to an appropriate motor-starting position. If necessary, a band of stator coils can be mechanically and electrically joined to another band of coils to form a larger diameter stator. In addition, the bands can be layered with the coils of one circuit directly aligned and electrically phased with the coils on another circuit, to generate stronger like magnetic poles and increase the magnetic field strength.

The layered coils can also be electrically connected in series to increase the overall stator resistance, allowing the stator to operate at higher voltages.

An electronic commutator circuit is connected to the motor stator coils to selectively switch the flow of electrical current to individual groups of coil windings. The circuit can be a type H-bridge drive circuit, for example, and can be included as a printed circuit assembly attached to the stator.

The rotor assembly 14 is centrally positioned within the stator and comprises a ferrous, ring-shaped, rotor band 15 with a plurality of peripherally placed permanent magnets 18. The rotor band serves to uniformly direct the flux paths of the permanent magnets to improve motor performance.

The direction of magnetization of the rotor magnets is radial and the magnets are arranged around the rotor band in a configuration of alternating magnetic poles.

A strut structure 16 is attached to the rotor band and supports a central axis hub 17. The hub may include a suitable axle and bearing assembly to support the rotor assembly and provide coupling to a powered device.

The motor operates when electromagnetic torque energy, developed by interacting magnetic fields between the rotor and stator, causes rotation of the rotor hub, as is well known in the art.

Figure 2:
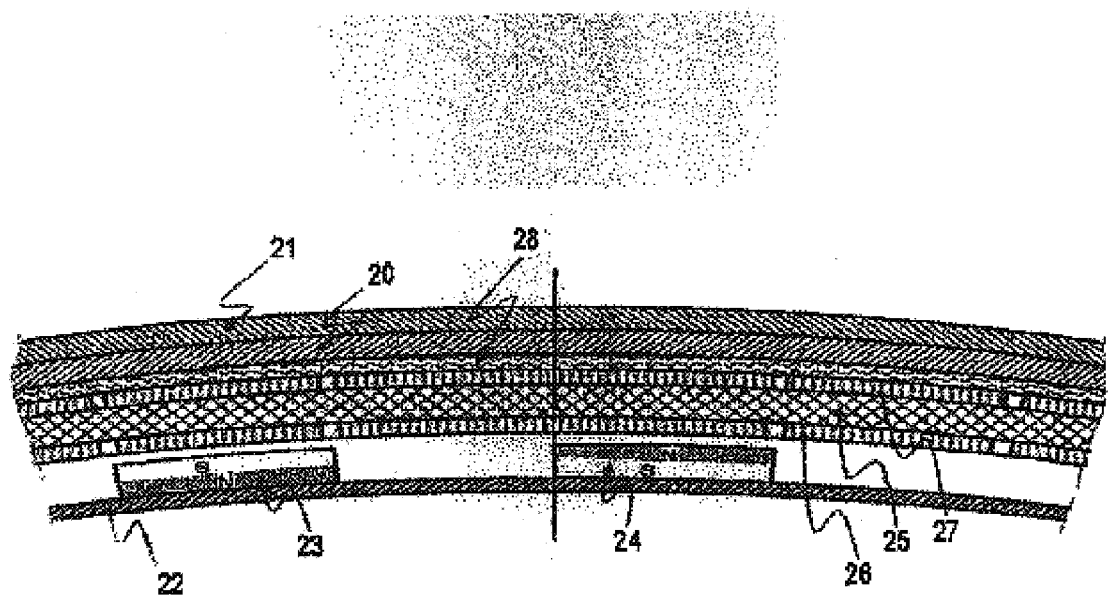
FIG. 2 is an axial cross-sectional view of a rotor and stator assembly of the invention.

With reference to FIG. 2, a longitudinal section of the rotor and stator assembly of a motor of the invention is illustrated. In this embodiment, the stator magnetic bridge is fixed in close proximity to the stator.

A ferrous ring-shaped rotor band 22 has a plurality of radially-magnetized permanent magnets attached around its outer periphery with each adjacent magnet having the opposite polarity. For example, as shown in FIG. 2, a north-south polarity magnet 23 is placed adjacent to a south-north polarity magnet 24.

The stator ring 25 is located in close proximity to, but not touching, the rotor magnets and is made of an electrically non-conductive substrate material with a layer of flat printed circuit coils 26 bonded to the underside of the substrate and another layer of flat printed circuit coils 27 bonded to the top side of the substrate. Individual coils on each layer can be electrically connected together, through the substrate, using via's or copper plated holes, as is well known in the art.

In one embodiment of the stator, individual coils are placed adjacent to each other with each coil being wound in the opposite direction. In this configuration, when current is commutated through the coils, like magnetic poles are created on two adjacent coils at any one point in time, forming one stator magnetic pole.

Located on the outer periphery of the stator ring is a magnetic bridge formed by a continuous wire wrapping of a first layer 20 of ferrous wire and a second layer of ferrous wire 21. The magnetic bridge is separated from the stator coils by a thin ring of nonconductive material 28.

Figure 3:
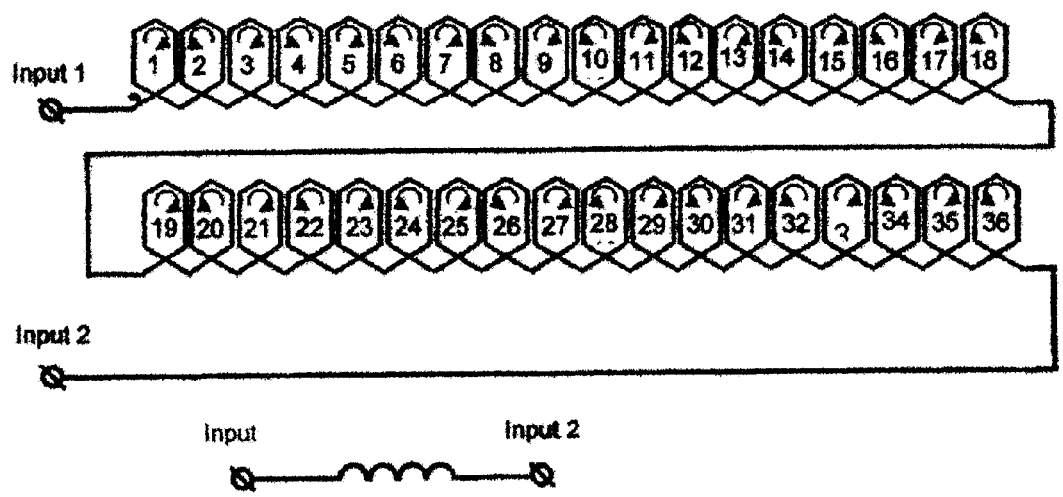
FIG. 3 is a schematic diagram of a single-phase stator coil circuit of the invention.

With reference to FIG. 3, a single-phase stator coil circuit is illustrated. The coils are connected in series to form a continuous circuit with adjacent coils having opposite polarities. In this configuration, each of the rotor's permanent magnets is oriented in the same polarity. A stator magnetic bridge is not necessary to bridge the rotor and stator's magnetic flux paths.

As shown in FIG. 3, two electrical connections are required to operate the stator circuit and a full bridge type electronic commutator circuit can be used to switch all coils at the same time.

Figure 4:
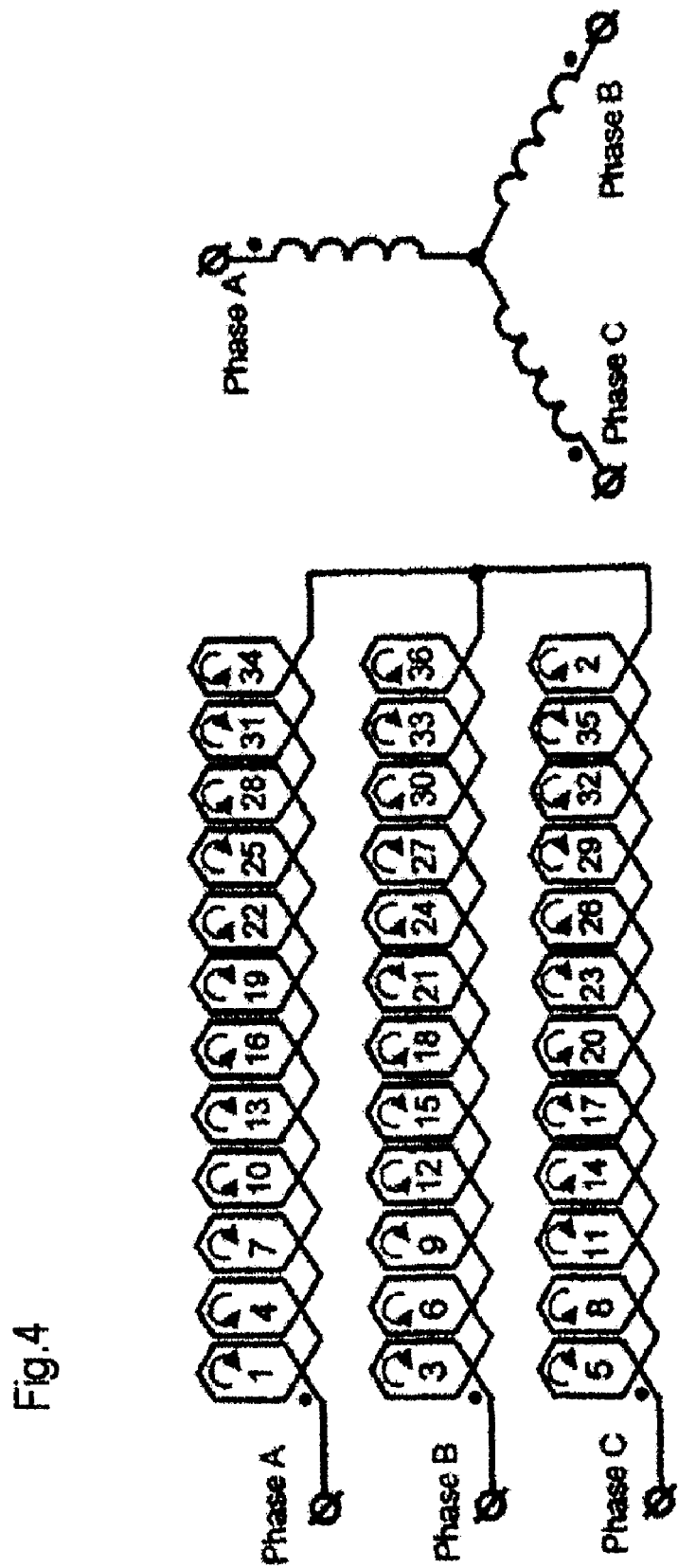
FIG. 4 is a schematic diagram of a three-phase stator coil circuit of the invention.

With reference to FIG. 4, a three phase stator coil circuit is illustrated. A three-phase Y configuration is shown but the stator coils may be connected in either a Delta or a Y circuit configuration.

The numbers on each coil represents the physical location of the coil in reference to other coils placed around the stator. The arrows represent the turn direction of each coil winding.

The phase connection points A, B and C indicate the electrical connection points to a specific group of stator coils. Phase A coils 1,4,7,10,13,16,19,22,25,28,31, and 34, for example, are shown combined with the coils of phases B and C.

In operation, when current is passed through phases A and B, adjacent coils 1 and 36, 4 and 3, etc. each in turn create one common magnetic pole. Similarly, common magnetic poles are created with phases A and C when current is passed through adjacent coils 1 and 2, 4 and 5, etc.

By switching the three phases of the stator in the proper sequence, a continuously rotating magnetic field around the stator ring can be created. In addition, the direction of motion of the rotor can be changed by altering any one of the stator's electrical phase connections.

Figure 5:
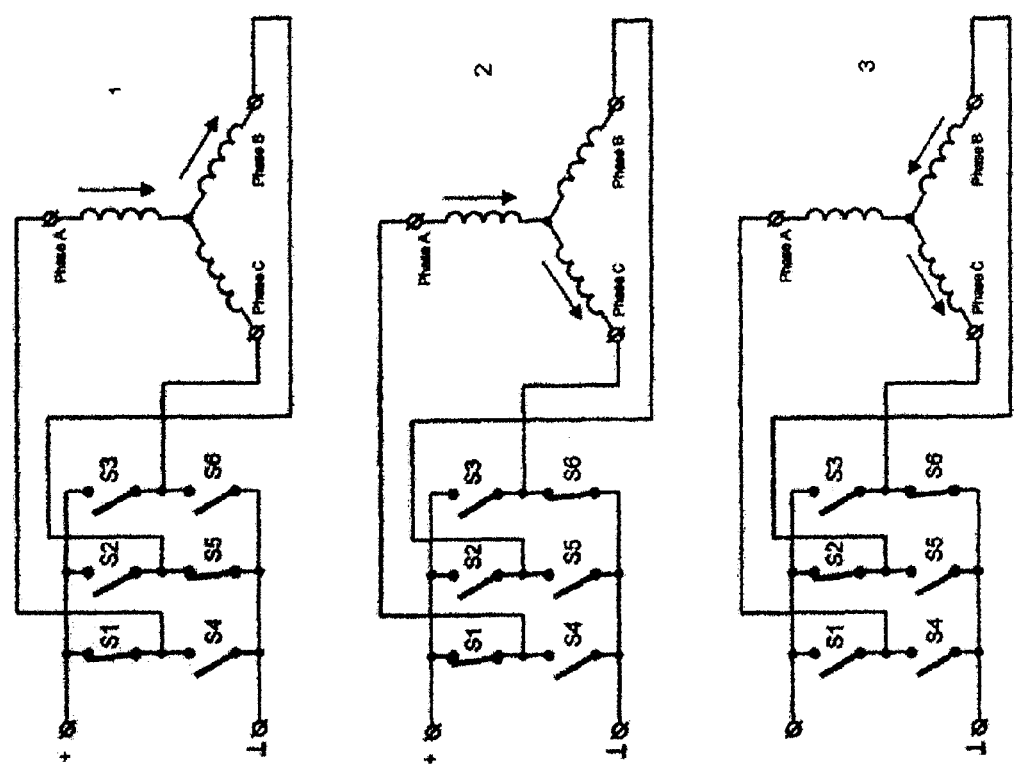
FIG. 5 is a functional diagram of a switch pattern for a three-phase commutating circuit of the invention.
Figure 6:
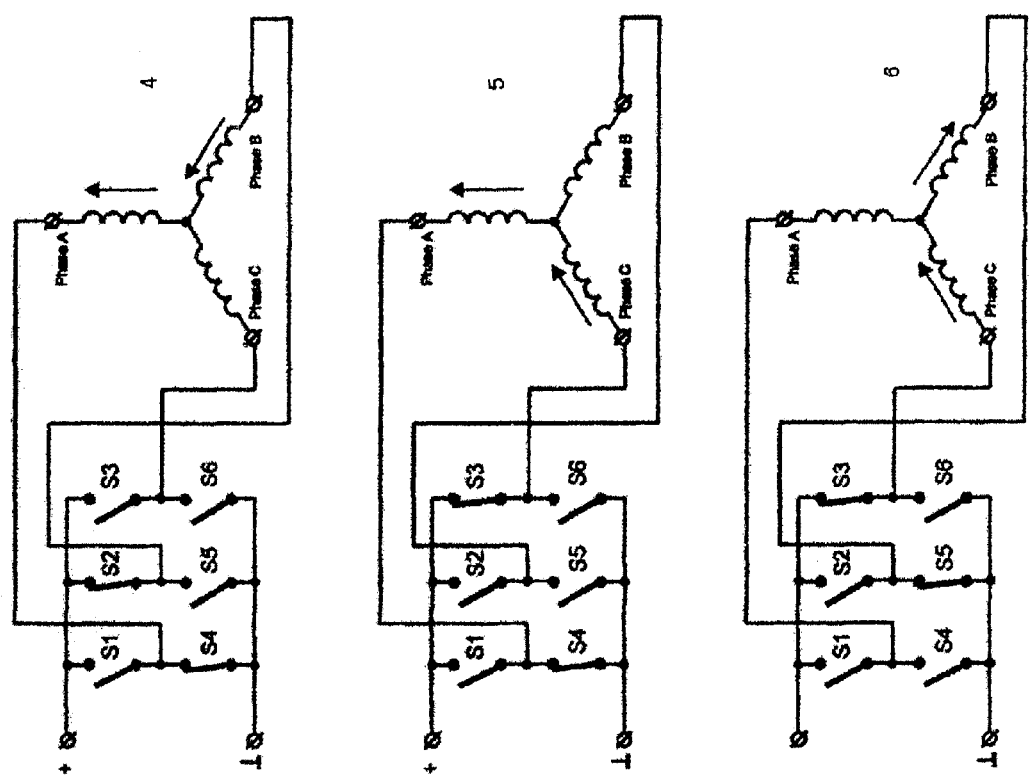
FIG. 6 is a continuation of the functional diagram of FIG. 5.

With reference to FIGS. 5 and 6, commutator switching logic for a three-phase stator coil circuit of the invention is shown. Switches S1 through S6 generate the proper switching sequence and are illustrated as common mechanical switches. In actual practice the switches are replaced by solid state switching devices including power transistors, MOSFET's, or IGBT's.

The stator coil switching sequence to complete one three-phase cycle is shown. Six steps are required to complete the cycle where each step represents the transition of a rotor magnet to a different pair of coils around the stator.

FIG. 5 illustrates the first step in the cycle with switches S1 and S5 closed to allow current to flow through Phase A and Phase B coil windings. At this time, Phase C coils have no current flowing through them. The second step in the cycle has switches S1 and S6 closed allowing current to flow through Phase A and Phase C coils. Phase B coils have no current passing through them at this time. The third step in the cycle has switches S2 and S6 closed allowing current to flow through Phase B and phase C coils. Phase A coils at this time have no current flowing through them.

FIG. 6 illustrates the fourth step in the cycle with switches S2 and S4 closed allowing current to flow through Phase B and Phase A coils. Phase C coils have no current passing through them. At this time, current is flowing through the same coils as in the first step of the cycle, but in the reverse direction. Accordingly, Phase A and Phase B coils have reversed magnetic polarities from the polarities in the first step of the cycle. The fifth step in the cycle has switches S3 and S4 closed allowing current to flow through Phase C and Phase A coils. Phase B coils at this time have no current passing through them. At this time, current is flowing through the same coils as in the second step of the cycle, but in the reverse direction. Accordingly, Phase C and Phase A coils have reversed magnetic polarities from the polarities in the second step of the cycle. The sixth step in the cycle has switches S3 and S5 closed allowing current to flow through Phase C and Phase B coils. Phase A coils have no current passing through them. At this time, current is flowing through the same coils as in the third step of the cycle, but in the reverse direction. Accordingly, Phase B and Phase C coils have reversed magnetic polarities from the polarities in the third step of the cycle.

The stator coil commutator completes one full switching cycle upon completion of the sixth step in the switching sequence to cause a complete rotation of the rotor assembly. The cycles are repeated for continuous rotation of the rotor.

The commutator may be a solid-state device using, for example, bi-polar transistors or power MOSFET,s to switch current through the stator coils.

The rotor position, used for timing in the commutation process, may be sensed by one or more magnetic Hall Effect devices using existing magnets on the rotor assembly or by using a separate array of magnets arranged for this purpose. Other types of position sensors including optical sensors may also be used.

The rotor hub of the invention may include a suitable axle and bearing assembly to deliver electromagnetic torque energy to a device connected to the axle. The rotor, however, may also be formed as part of an impeller or fan assembly where the torque energy of the rotating hub is used directly and is not transferred by a shaft to an external device.

Figure 7:
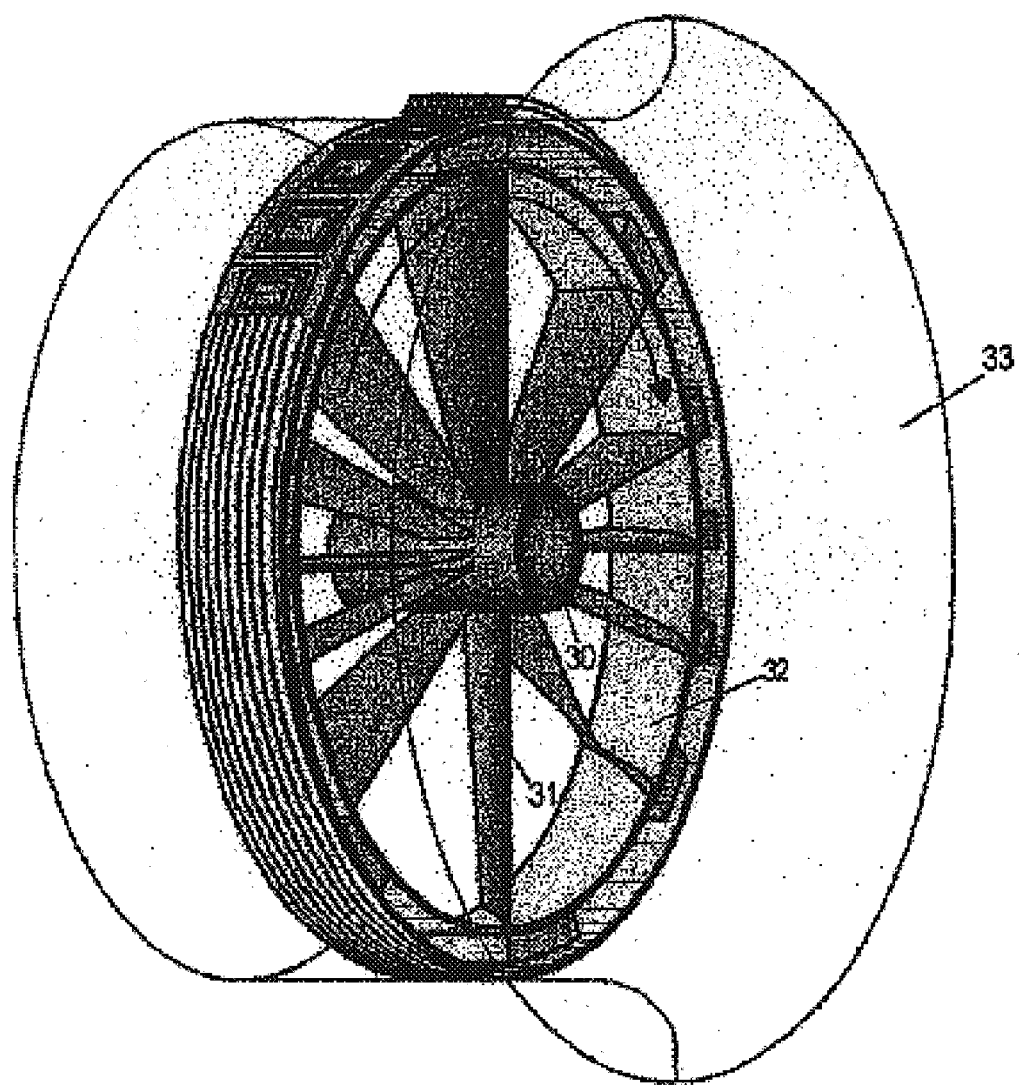
FIG. 7 is a structural view of an axial fan embodiment of the invention.

With reference to FIG. 7, an integrated fan assembly of the invention is shown. The rotor strut structure 31 of the motor assembly is attached to the rotor band 32 and is configured as blades of an axial flow fan. In this embodiment, the diameter of the rotor central hub 30 is minimized to reduce blockage of the air stream and increase the airflow area. A bell mouth structure 33 can be added to the assembly to control the airflow path.

Figure 8:
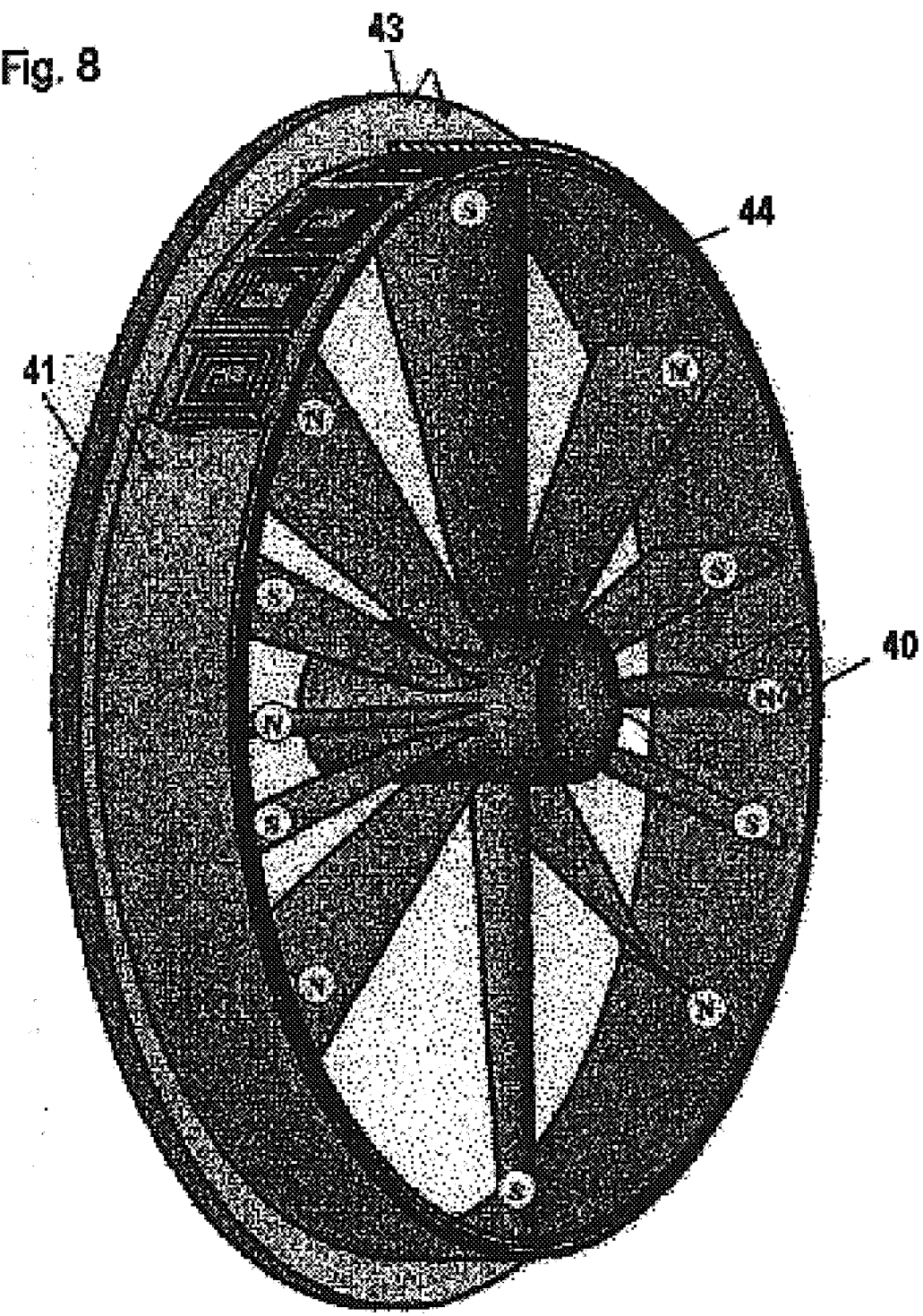
FIG. 8 is a structural view of a fluid impeller embodiment of the invention.

With reference to FIG. 8, an integrated fluid impeller embodiment of the invention is shown where the impeller blades 40 are made from a plastic magnetic material and the rotor hub 42 is made of a feffous material. In this embodiment, the impeller blades 40 and the rotor hub 42 form a rotor assembly. A stator magnetic bridge 41 is fixed to the stator 44 and does not rotate with the rotor assembly. A bell mouth structure 43 may be included to direct the fluid flow and provide support for the stator.

The stator coil assembly of the invention can be fabricated as a single layer of coil windings, located on the top and bottom sides of a substrate, with each layer comprising several pairs of coil windings.

Figure 9:
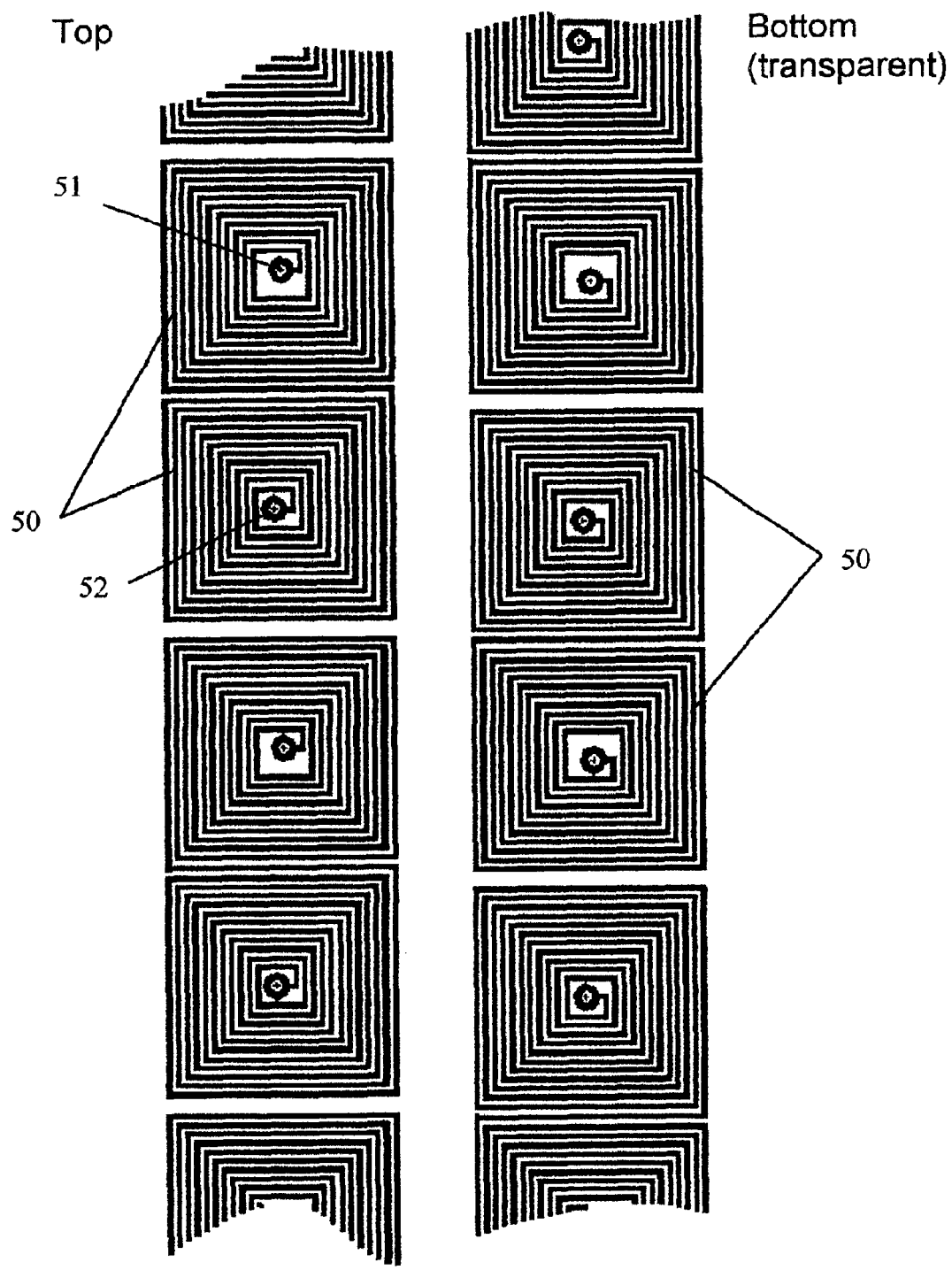
FIG. 9 is an illustrative view of a band of stator coils of the invention.

As shown in FIG. 9, each pair of coils 50 is made as a spiral winding extending from the center of a start coil winding 51 to a center of an end coil winding 52 with the same turn direction of the spiral in relation to each coils center. The layers of coil windings are the same in a transparent view and are shifted linearly so that the center of the start coil windings on the top side of the substrate are electrically connected to the center of the end coil windings on the bottom side of the substrate using via's or copper plated holes through the substrate. The circuit of one layer of coil windings can be interrupted (broken) to provide connecting power leads to a commutator circuit.

The stator coil assembly can also be integrated with a housing or fan shroud of a motor of the invention.

Figure 10:
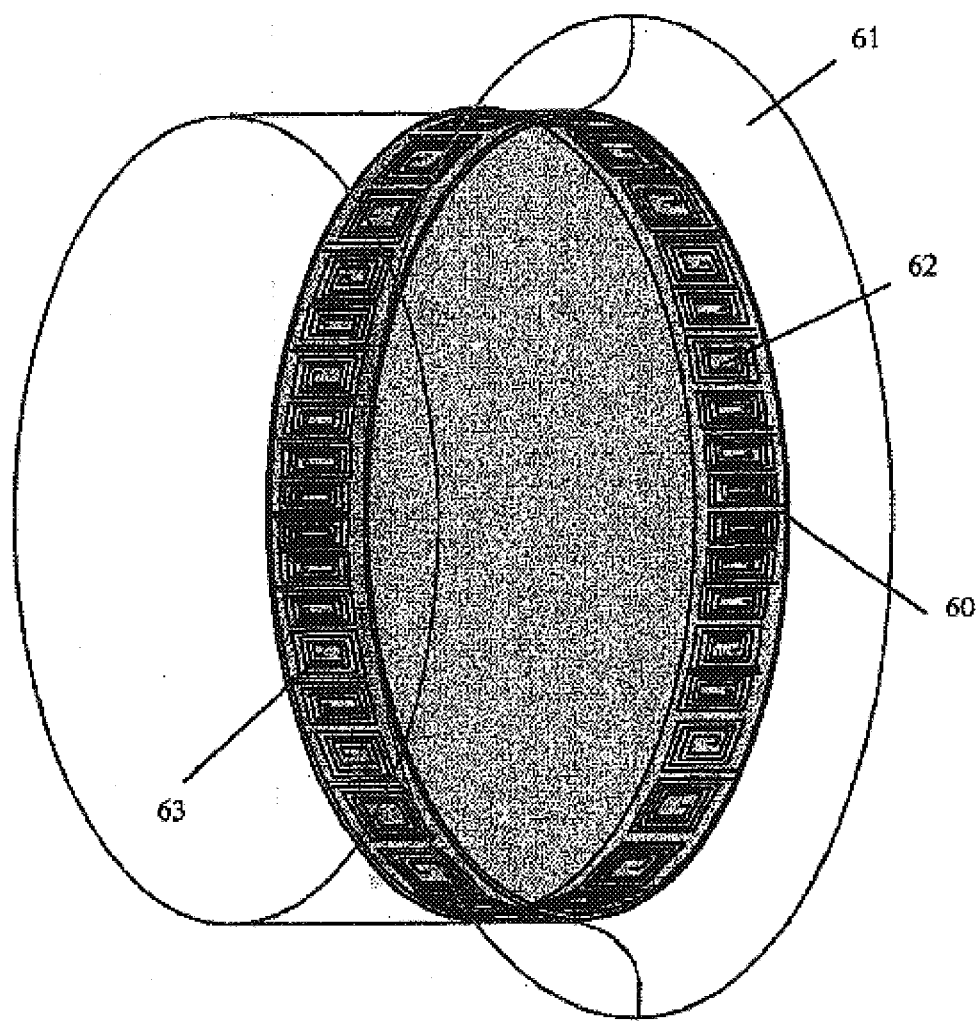
FIG. 10 is a structural view of an integrated stator coil assembly.

With reference to FIG. 10, a thin wall plastic ring substrate 60 is formed as part of a housing or shroud assembly 61. The substrate can be rolled with a thin laminate of copper or can be electrically deposited with copper along the inside and outside circumferences of the ring. The stator coils are etched or electrically deposited using printed circuit board fabrication techniques on the inner circumference 62 and outer circumference 63 of the ring using a UV light photo exposure or silkscreen method.

Although the various features of novelty that characterize the invention have been described in terms of certain preferred embodiments, other embodiments will become apparent to those of ordinary skill in the art, in an objective view of the disclosure herein. Accordingly, the present invention is not intended to be limited by the recitation of the preferred embodiments, but is instead intended to be defined solely by reference to the appended claims.

What is claimed is:

1. A direct current brushless motor—fan assembly comprising:

a fan having an impeller with a plurality of blades;

a ring-shaped stator having a plurality of circumferentially placed printed circuit windings;

a magnetic rotor disposed within said stator and having central axis hub and magnetic means magnetized in radial direction, wherein said magnetic means are made as the parts of said impeller, so that said magnetic rotor is the same time said impeller of the fan;

and an electronic commutator of said printed circuit windings whereby electric current is selectively switched by said commutator circuit through said windings to generate a rotating magnetic field whereby electromagnetic torque-energy developed by interacting magnetic fields of the rotor and stator causes rotation of the rotor around the rotor central axis.

2. The direct current brushless motor—fan assembly of claim 1, wherein said ring-shaped stator further comprises a magnetic band of one or more layers of ferrous material surrounding said printed circuit windings and operative to connect and concentrate magnetic flux between said printed windings of said stator and said rotor magnetic means.

3. The direct current brushless motor—fan assembly of claim 2, wherein said magnetic band is made rotatable and mechanically connected to the rotor.

4. The direct current brushless motor—fan assembly of claim 1, wherein said magnetic means of the rotor is the outer magnetized ring of said impeller that supports said plurality of blades.

5. The direct current brushless motor—fan assembly of claim 1, wherein said magnetic means of the rotor are the magnetized blades of said impeller of the fan.

* * * * *